April 20, 1926.
A. F. MASURY ET AL
1,581,588
CUSHIONED SUPPORT FOR VEHICLE BODIES
Filed May 28, 1924     4 Sheets-Sheet 3
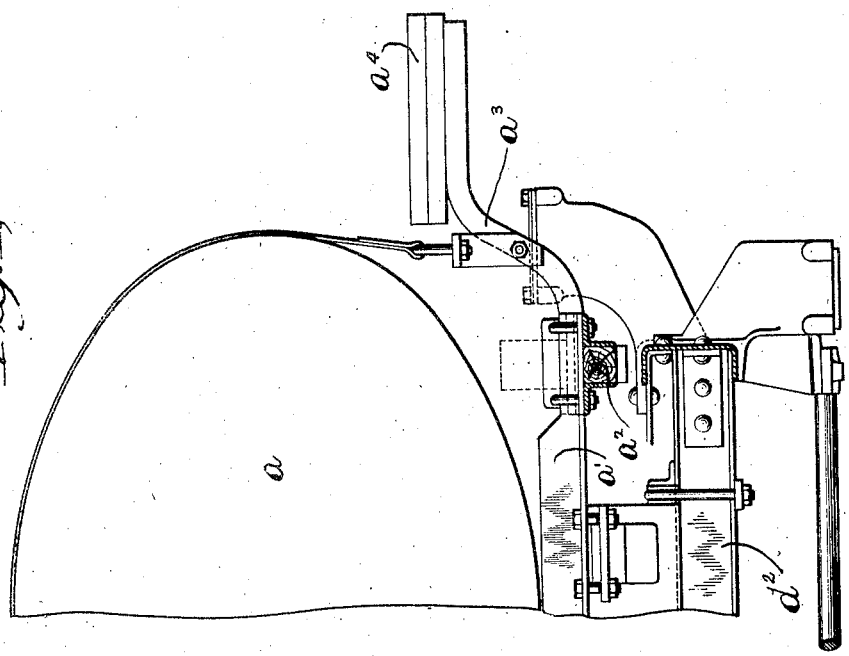
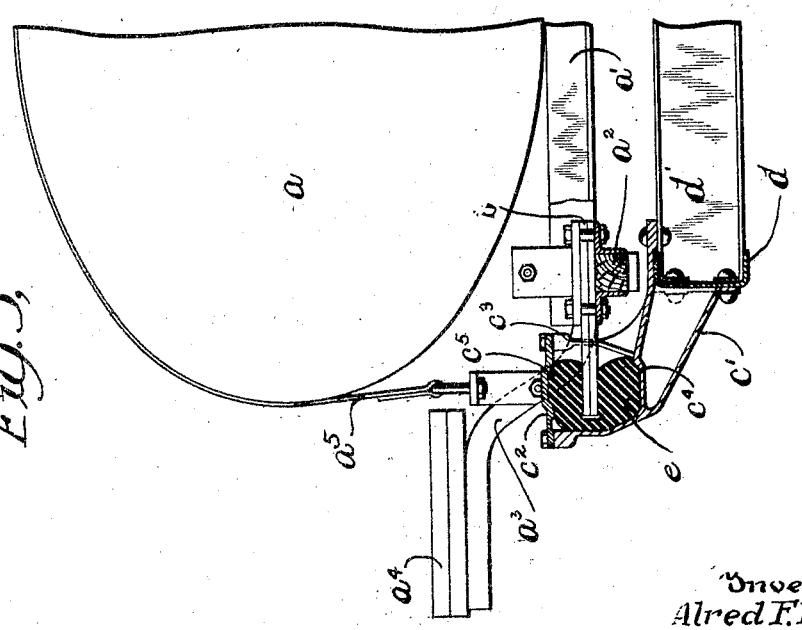
Inventors
Alred F. Masury,
George O. Hanshew,
William B. Jupp.

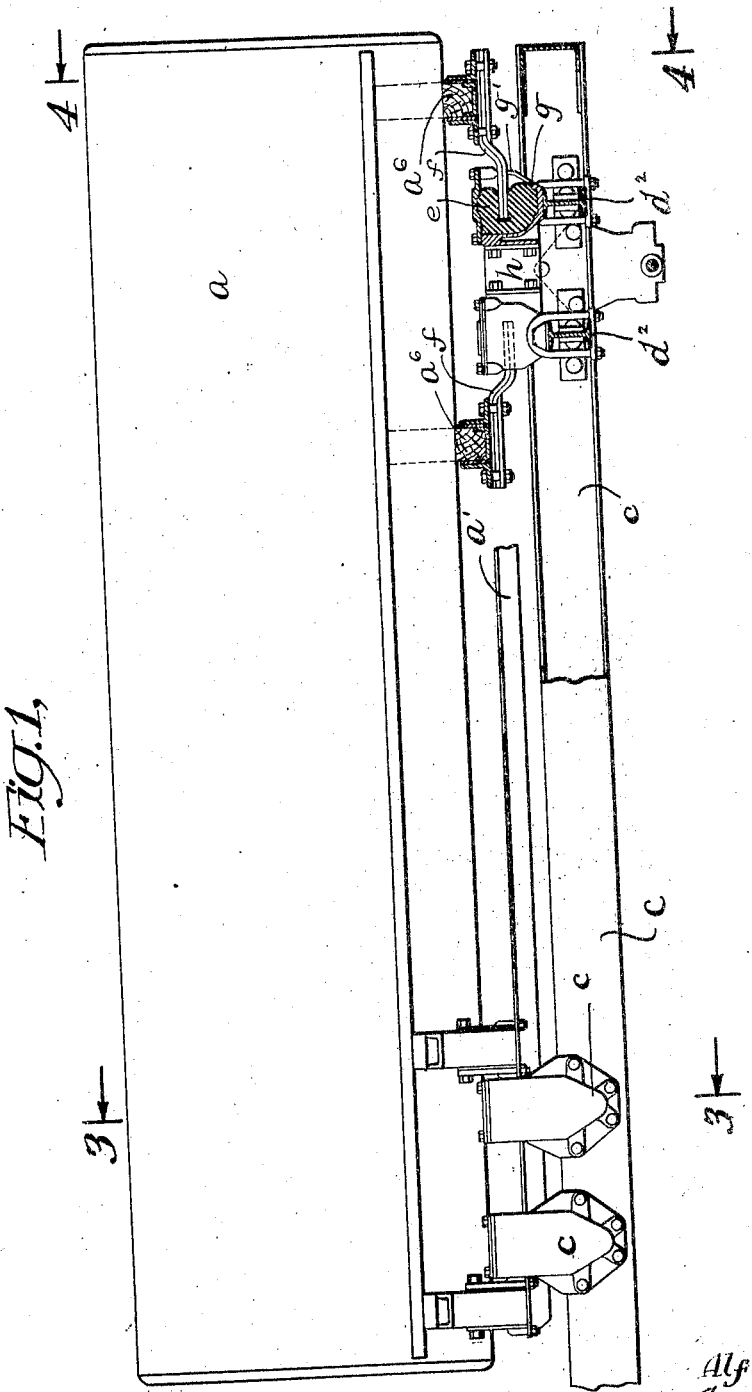

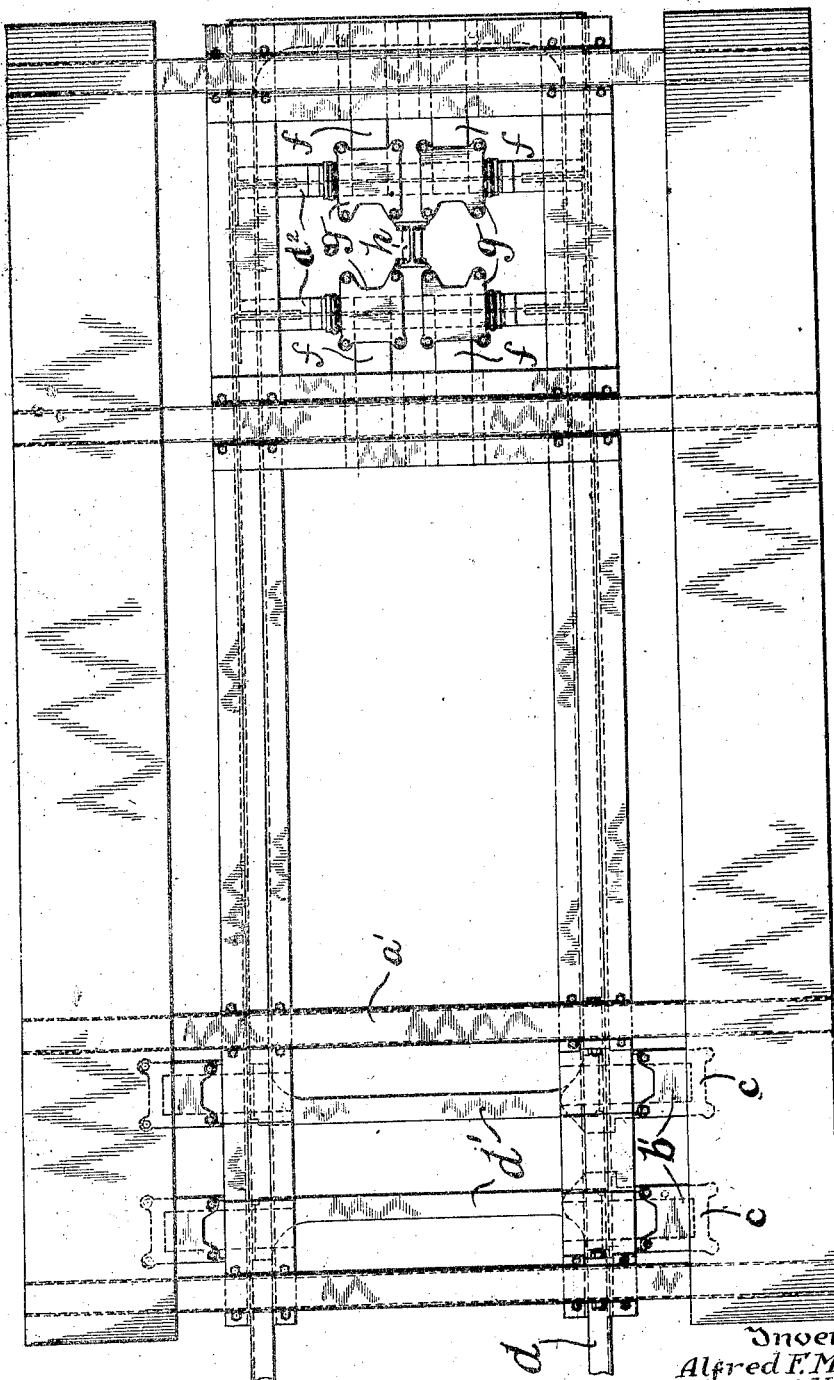

April 20, 1926.

A. F. MASURY ET AL 1,581,588

CUSHIONED SUPPORT FOR VEHICLE BODIES

Filed May 28, 1924     4 Sheets-Sheet 4

Inventors
Alfred F. Masury,
George O. Hanshew,
William B. Jupp.
By their Attorneys
Redding Greeley O'Shea & Campbell.

Patented Apr. 20, 1926.

1,581,588

UNITED STATES PATENT OFFICE.

ALFRED F. MASURY, OF NEW YORK, GEORGE O. HANSHEW, OF BROOKLYN, AND WILLIAM B. JUPP, OF NEW YORK, N. Y., ASSIGNORS TO INTERNATIONAL MOTOR COMPANY, OF NEW YORK, N. Y., A CORPORATION OF DELAWARE.

CUSHIONED SUPPORT FOR VEHICLE BODIES.

Application filed May 28, 1924. Serial No. 716,321.

*To all whom it may concern:*

Be it known that we, ALFRED F. MASURY, GEORGE O. HANSHEW, and WILLIAM B. JUPP, citizens of the United States, residing respectively, in the borough of Manhattan, borough of Brooklyn, and the borough of Manhattan, of the city of New York, in the State of New York, have invented certain new and useful Improvements in Cushioned Supports for Vehicle Bodies, of which the following is a specification, reference being had to the accompanying drawings, forming a part hereof.

This invention relates to a yielding mounting for a body with respect to a vehicle frame with latitude for relative movement therebetween. More specifically the invention relates to a three-point non-metallic cushioned support for the bodies of motor vehicles particularly applicable for mounting tanks whereby the shocks impressed thereupon by the liquid surging back and forth therein may be absorbed or cushioned and not transmitted with undiminished intensity to the chassis frame. The support also provides a non-rigid connection between the body and chassis frame whereby the chassis is free to weave when traveling over inequalities in the road and the stresses arising therefrom are not impressed upon the body. In a copending application by Hanshew and Jupp filed on May 27, 1924 Serial No. 716,081, a three-point cushioned support is disclosed and claimed broadly. The present invention has to do with improvements and specific practical applications thereof which are shown in the accompanying drawings and described in the following specification.

In the drawings:

Figure 1 is a view in side elevation showing a portion of a vehicle frame, a body and one modification of a three-point cushioned support therefor according to the present invention, parts being broken away in the interest of clearness.

Figure 2 is a plan view showing the three-point support as illustrated in Figure 1.

Figure 3 is a fragmentary view partly in section taken in the plane indicated by the line 3—3 in Figure 1 and looking in the direction of the arrows and showing one of the points of support.

Figure 4 is a fragmentary view taken in the plane indicated by the line 4—4 in Figure 1 and looking in the direction of the arrows and showing another point of support.

Figure 6:
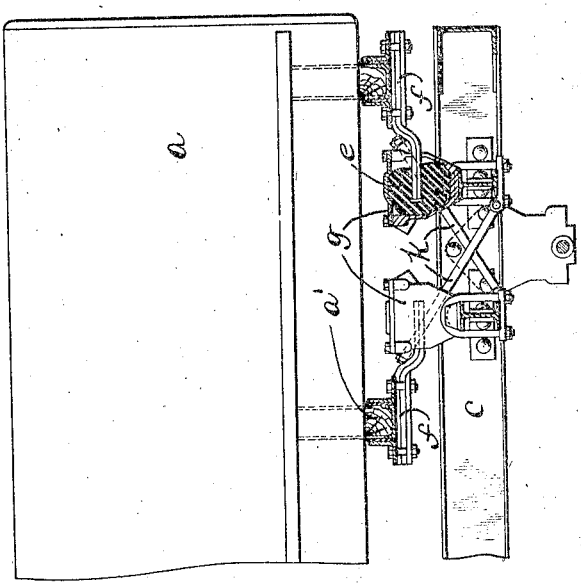
Figure 6 is a fragmentary view showing another modified construction of one point of support.

While the invention will be described and illustrated as embodying a tank mounting, it is to be understood that the invention is equally applicable in any situation in which any type of body is to be supported upon a vehicle frame with provision for relative movement therebetween. Referring to Figures 1 to 4 a tank $a$ is illustrated as resting upon transverse supports $a'$ extending between sills $a^2$. Arms $a^3$ extending outwardly from the sills at predetermined intervals support platforms $a^4$ and to the arms $a^3$ is secured at its extremities straps $a^5$ serving to rigidly retain the tank $a$ in position. At one end of the tank and secured to and extending transversely from the sills $a^2$ are arms $b$. In the preferred embodiment a pair of such arms extend outwardly at each side of the supporting frame and are secured in any convenient manner to the sills adjacent transverse supports $a'$. Each of these arms $b$ extends into a housing indicated in general at $c$ carried upon a longitudinal side member $d$ of the chassis frame. The housing $c$ is preferably formed with a bracket $c'$ suitably shaped to be secured to the channel $d$ and to the top of a cross element $d'$ which serves as a brace for the frame at the points of greatest stress. The top of each housing $c$ is open and is adapted to be closed by a cover $c^2$ which serves as the top wall of the housing. The inwardly facing wall of the housing is formed with an opening $c^3$ through which the arm $b$ extends. Within the housing is contained a block $e$ of yielding non-metallic material such as rubber which is so shaped and is of such size as to be retained within the housing under compression. By so retaining block $e$ its resiliency, strength and wearing qualities are increased. If desired seats $c^4$, $c^5$ may be formed in the bottom of the housing and closure $c^2$, respectively, to facilitate the retaining of the block in the desired relationship within the housing.

Rearwardly of the tank $a$ and secured in any convenient manner to a pair of transverse supports $a'$ are arms $f$. These arms are disposed substantially midway between the sills $a^2$ and extend in the longitudinal direction of the vehicle. While a single pair of arms may be disposed exactly in the median plane of the vehicle it is preferred to use pairs of arms with one of each pair disposed upon opposite sides and in close proximity to the median line of the vehicle. The arms on the rearwardly disposed transverse support extend in a forwardly direction and the arms on the forwardly disposed transverse support extend in a rearwardly direction. In the embodiment illustrated in Figure 1 the arms $f$ are offset in a downward direction and extend into housings $g$ carried upon transverse members $d^2$, $d^2$ of the chassis frame. Four such housings $g$ are disclosed arranged in pairs, the rearwardly disposed pair having an opening $g'$ in the rearwardly facing side thereof through which the arm $f$ extends. While the forwardly disposed housings have an opening in the forwardly facing side thereof into which the rearwardly extending arms project. In other respects the housings are identical with the housings $c$ and are adapted to contain therewithin blocks $e$ which engage the ends of the respective arms $f$. In order to brace the housings and overcome any tendency to rotation thereof about their points of support upon the I-beams $d^2$, a bracing element $h$ is adapted to be secured to the proximate faces of the pairs of housings for the transmission of stresses therebetween.

The cushion supports just discussed will be seen to give a three-point support for the body upon the chassis frame. The points disposed respectively upon opposite sides of one end of the body and formed by the connections including the housings $c$, form two of the points of support. While the connections on each side do not constitute, strictly speaking, a point of support since there are two housings and their associated parts, nevertheless, the housings on each side are so close together as to constitute for all practical purposes a single point of support. The third point of support is embodied at the other end of the body and is formed by the four housings $g$ and their associated parts. Here again a single point of support is not, strictly speaking, provided but the four housings are disposed in such close proximity as to provide, for all practical purposes, a single point of support.

Figure 5:
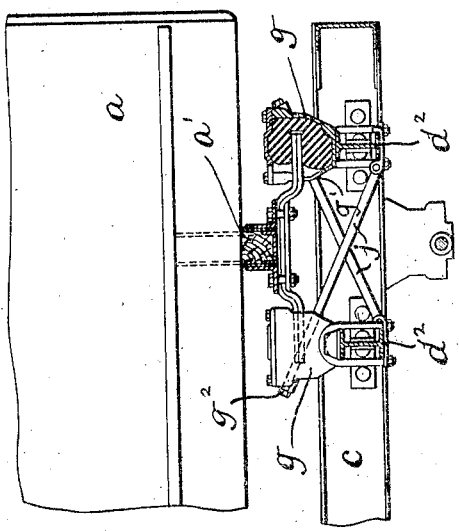
Figure 5 is a fragmentary view of a modified construction at a single point of support.

Figure 5 illustrates a modification of the invention in which the arms included in the single point of support at the one end of the vehicle extend in opposite directions from a single transverse support $a'$. In this instance, the openings $g'$ are formed in the proximate faces of the respective housings. In all other respects the housings are similar to the housings previously discussed in connection with the modification illustrated in Figure 1. In lieu of the brace $h$ tension rods $j$ are secured to the respective pairs of housings as at $g^2$ and extend downwardly in crossed relation to be secured at their lowermost ends in suitable manner to the I-beam $d^2$. It will be readily appreciated that any tendency of the housings $g$ to turn about their points of support upon the transverse members $d^2$ occasioned by relative movement of the body $a$ and chassis frame $c$ will be resisted by the rods $j$.

A construction is illustrated in Figure 6 in which the arms and housings are disposed generally similar to their disposition in the construction illustrated in Figure 1. In lieu of the spacer $h$, however, rods $k$ are provided in a manner very similar to that described in connection with Figure 5.

It will thus be apparent that a construction has been devised which provides substantially a three-point support for a vehicle body whereby relative movement between the body and chassis frame is permitted without subjecting either one thereof to undue stresses or strains. Furthermore, the chassis frame not being rigidly connected to the body at a plurality of points, is free to weave in passing over inequalities in the road. The interposition of rubber blocks between the frame and body also serves to cushion or absorb shocks and vibrations which might otherwise be transmitted in undiminished intensity therebetween. The rubber blocks yield and compress and also serve in this manner to facilitate relative movement between the body and chassis frame. To further the provision for relative movement in this respect the arms $b$, $f$ and F may take the form of springs or other resilient elements as will be readily understood.

No attempt has been made to illustrate every form which the present invention may take but the various modifications disclosed in the drawings may be considered as illustrative of preferred constructions embodying the inventive idea. Other modifications not departing from the spirit and scope of the invention will occur to those skilled in the art and no limitation is intended except as indicated in the appended claims.

What we claim is:

1. In combination with a vehicle frame and the body of the vehicle, a three point yielding suspension for the body comprising transverse arms disposed upon opposite sides of the body near one end thereof, housings carried upon opposite sides of the frame and having an open side respectively into which an arm extends, and blocks of yielding non-metallic material disposed within the housings and engaging the ends of the arms, pairs of arms carried near the other end of the body substantially centrally thereof the arms of each pair extending in opposite directions and in parallel relation to the other pair, housings carried with the vehicle frame and having open sides respectively into which the second named arms extend, and blocks of yielding non metallic material disposed within the housings and engaging the ends of the arms.

2. In combination with a vehicle frame and the body of the vehicle, a three point yielding suspension for the body comprising transverse arms disposed upon opposite sides of the body near one end thereof, housings carried upon opposite sides of the frame and having open sides respectively into which said arms extend, blocks of yielding non-metallic material confined within the housings under compression and engaging the ends of the arms, pairs of other arms carried near the other end of the body substantially centrally thereof the arms of each pair extending in opposite directions and in parallel relation to the other pair, housings carried with the vehicle frame and having open sides respectively into which the second named arms extend, and blocks of yielding non-metallic material confined within the housings under compression and engaging the ends of the arms.

3. In combination with a vehicle frame and the body of the vehicle, a three point yielding suspension for the body comprising transverse resilient arms disposed upon opposite sides of the body near one end thereof, housings carried upon opposite sides of the frame and having an open side respectively into which a resilient arm extends and blocks of yielding non-metallic material disposed within the housings and engaging the ends of the resilient arms, pairs of resilient arms carried substantially centrally of the body near the other end thereof, the arms of each pair extending in opposite directions and in parallel relation to the other pair, housings carried with the vehicle frame and having open sides respectively into which the second named resilient arms extend and blocks of yielding non-metallic material disposed within the housings and engaging the ends of the resilient arms.

4. In combination with a vehicle frame and the body of the vehicle, a three point yielding suspension for the body comprising pairs of transverse arms disposed respectively upon opposite sides of the body near one end thereof, pairs of housings carried upon opposite sides of the frame and having open sides respectively into which the arms extend, blocks of yielding non-metallic material confined within the housings and engaging the ends of the arms, pairs of arms carried substantially centrally of the body near the other end thereof and extending, in parallel pairs in opposite directions, pairs of housings carried upon the frame and having open sides respectively into which the second named arms extend and blocks of yielding non-metallic material confined within the housings and engaging the ends of the arms.

5. The combination with a chassis frame having transverse elements and a vehicle body having sills and transverse supporting members therebetween of a three point yielding suspension for the body comprising pairs of arms secured to the sills and extending outwardly transversely of the body upon opposite sides near one end thereof, pairs of housings each formed with an opening in one side carried with the chassis frame upon opposite sides thereof and into which the ends of the arms extend, blocks of yielding non-metallic material confined within the housings and engaging the ends of the arms, pairs of arms carried with the transverse supporting members of the body substantially centrally thereof and extending in opposite directions in the longitudinal direction of the body, pairs of housings carried upon the transverse elements of the chassis frame and formed with open sides respectively into which the ends of the longitudinal arms extend, blocks of yielding non-metallic material confined within the housings and engaging the ends of the longitudinal arms and means to counteract turning of the housings about their points of support.

6. A support between the chassis and body of a vehicle comprising parallel transverse supporting members at one end of the chassis, housings mounted on the members and having openings in opposite sides thereof, non-metallic resilient cushioning means within the housings, saddle members carried by the body at each end, pairs of oppositely projecting longitudinal arms carried by the saddle members and extending into the housings and seated in the cushioning means, and means between the opposed housings and mountings to prevent turning of the housings about their points of support.

7. A support between the chassis and body of a vehicle comprising parallel transverse supporting members at one end of the chassis, housings mounted on the members and having openings in opposite sides thereof, non-metallic resilient cushioning means within the housings, saddle members carried by the body at each end, pairs of oppositely projecting longitudinal arms carried by the saddle members and extending into the housings and seated in the cushioning means, and brace members between opposed housings and transverse members to prevent turning of the housings about their points of support.

This specification signed this 24 day of May A. D. 1924.

ALFRED F. MASURY.
GEORGE O. HANSHEW.
WILLIAM B. JUPP.